(12) United States Patent
Matusik et al.

(10) Patent No.: US 10,926,473 B1
(45) Date of Patent: Feb. 23, 2021

(54) MULTI-MATERIAL SCANNING FOR ADDITIVE FABRICATION

(71) Applicant: Inkbit, LLC, Medford, MA (US)

(72) Inventors: Wojciech Matusik, Lexington, MA (US); Aaron Weber, Arlington, MA (US); Desai Chen, Arlington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 16/796,137

(22) Filed: Feb. 20, 2020

(51) Int. Cl.
*B29C 64/386* (2017.01)
*B33Y 10/00* (2015.01)
*B29C 64/393* (2017.01)
*B33Y 50/00* (2015.01)
*B33Y 30/00* (2015.01)
*G01N 21/84* (2006.01)

(52) U.S. Cl.
CPC .......... *B29C 64/386* (2017.08); *B29C 64/393* (2017.08); *B33Y 10/00* (2014.12); *B33Y 50/00* (2014.12); *B33Y 30/00* (2014.12); *G01N 21/8422* (2013.01); *G01N 2021/8427* (2013.01); *G01N 2021/8438* (2013.01); *G01N 2201/10* (2013.01)

(58) Field of Classification Search
None
See application file for complete search history.

(56) References Cited

U.S. PATENT DOCUMENTS

| | | | |
|---|---|---|---|
| 6,492,651 B2 | 12/2002 | Kerekes | |
| 9,562,759 B2 | 2/2017 | Vogler et al. | |
| 9,952,506 B2 | 4/2018 | Arai et al. | |
| 10,252,466 B2 | 4/2019 | Ramos et al. | |
| 10,456,984 B2 | 10/2019 | Matusik et al. | |
| 2002/0104973 A1 | 8/2002 | Kerekes | |
| 2008/0124475 A1 | 5/2008 | Kritchman | |
| 2009/0073407 A1 | 3/2009 | Okita | |
| 2009/0279089 A1 | 11/2009 | Wang | |
| 2009/0279098 A1 | 11/2009 | Ohbayashi et al. | |
| 2013/0182260 A1 | 7/2013 | Bonnema et al. | |

(Continued)

FOREIGN PATENT DOCUMENTS

EP 3459716 A1 3/2019
JP 6220476 B1 10/2017

(Continued)

OTHER PUBLICATIONS

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

(Continued)

*Primary Examiner* — Benjamin A Schiffman
(74) *Attorney, Agent, or Firm* — Occhiuti & Rohlicek LLP

(57) ABSTRACT

A scanning approach used in the feedback procedure is able to distinguish between different materials, for example, based on spectral properties (e.g., color) of reflectance from a partially fabricated object. Because material layers can be quite thin, and in general the materials are not completely opaque, properties of subsurface layers can greatly affect the reflectance of a thin layer of one material over a thicker section of another material. Detection of locations of thin layers after a material change takes into account the reflectance characteristics of the object before the thin layer was deposited.

16 Claims, 4 Drawing Sheets

(56) References Cited

U.S. PATENT DOCUMENTS

| | | |
|---|---|---|
| 2013/0328227 A1 | 12/2013 | Mckinnon et al. |
| 2014/0249663 A1 | 9/2014 | Voillaume |
| 2014/0300676 A1 | 10/2014 | Miller et al. |
| 2015/0061178 A1 | 3/2015 | Siniscalchi et al. |
| 2015/0101134 A1 | 4/2015 | Manz et al. |
| 2015/0352792 A1 | 12/2015 | Kanada |
| 2016/0023403 A1 | 1/2016 | Ramos et al. |
| 2016/0101568 A1 | 4/2016 | Mizes et al. |
| 2016/0320771 A1 | 11/2016 | Huang |
| 2017/0021455 A1 | 1/2017 | Dallarosa et al. |
| 2017/0106604 A1 | 4/2017 | Dikovsky et al. |
| 2017/0120337 A1 | 5/2017 | Kanko et al. |
| 2017/0217103 A1 | 8/2017 | Babaei et al. |
| 2017/0355147 A1 | 12/2017 | Buller et al. |
| 2018/0017501 A1 | 1/2018 | Trenholm et al. |
| 2018/0056582 A1 | 3/2018 | Matusik et al. |
| 2018/0071984 A1 | 3/2018 | Lee et al. |
| 2018/0143147 A1 | 5/2018 | Milner et al. |
| 2018/0169953 A1 | 6/2018 | Matusik et al. |
| 2018/0297113 A1 | 10/2018 | Preston et al. |
| 2019/0271966 A1 | 9/2019 | Coffman et al. |
| 2019/0346830 A1 | 11/2019 | de Souza Borges Ferreira et al. |

FOREIGN PATENT DOCUMENTS

| | | |
|---|---|---|
| JP | 2018103488 A | 7/2018 |
| KR | 101567281 B1 | 11/2015 |
| WO | 2003/026876 A2 | 4/2003 |
| WO | 2017066077 A1 | 4/2017 |
| WO | 2018209438 A1 | 11/2018 |
| WO | 2019070644 A2 | 4/2019 |
| WO | 2019125970 A1 | 6/2019 |

OTHER PUBLICATIONS

Alarousu, Erkki, Ahmed AlSaggaf, and Ghassan E. Jabbour. "Online monitoring of printed electronics by spectral-domain optical coherence tomography." Scientific reports 3 (2013): 1562.

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.

Fischer, Björn, Christian Wolf, and Thomas Härtling. "Large field optical tomography system." In Smart Sensor Phenomena, Technology, Networks, and Systems Integration 2013, vol. 8693, p. 86930P. International Society for Optics and Photonics, 2013.

Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.

Klein, Thomas, and Robert Huber. "High-speed OCT light sources and systems." Biomedical optics express 8, No. 2 (2017): 828-859.

Moon, Sucbei, and Dug Young Kim. "Ultra-high-speed optical coherence tomography with a stretched pulse supercontinuum source." Optics Express 14, No. 24 (2006): 11575-11584.

Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.

Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.

Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.

Zhou, Chao, Aneesh Alex, Janarthanan Rasakanthan, and Yutao Ma. "Space-division multiplexing optical coherence tomography." Optics express 21, No. 16 (2013): 19219-19227.

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.

Blanken, Lennart. "Learning and repetitive control for complex systems: with application to large format printers." (2019).

Oomen, Tom. "Advanced motion control for next-generation precision mechatronics: Challenges for control, identification, and learning." In IEEJ International Workshop on Sensing, Actuation, Motion Control, and Optimization (SAMCON), pp. 1-12. 2017.

Kulik, Eduard A., and Patrick Calahan. "Laser profilometry of polymeric materials." Cells and Materials 7, No. 2 (1997): 3.

International Search Report dated Oct. 26, 2020 in PCT Application No. PCT/US2020/019014.

MULTI-MATERIAL SCANNING FOR ADDITIVE FABRICATION

BACKGROUND OF THE INVENTION

This invention relates to scanning of multiple materials in an additive fabrication system.

Additive fabrication, also referred to as 3D printing, refers to a relatively wide class of techniques for producing parts according to a computer-controlled process, generally to match a desired 3D specification, for example, a solid model. A class of fabrication techniques jets material for deposition on a partially fabricated object using inkjet printing technologies. The jetted material is typically UV cured shortly after it is deposited, forming thin layers of cured material. Often, the object is fabricated using a support material, such as wax, and a fabrication material, such as a UV-cured acrylate.

Feedback-based additive fabrication makes use of scanning of a partially fabricated object to determine characteristics of additional material to be added in forming the object according to a desired specification. For example, the scanning can provide dimensional information such as object thickness as a function of location that is used to plan thickness and/or locations for depositing a further layer of material. Using such feedback can compensate for unpredicted and/or variable fabrication characteristics related to aspects such as jetting rate, material flow, and/or shrinkage and/or expansion during curing.

SUMMARY OF THE INVENTION

Some objects are fabricated using multiple fabrication materials, for example, with different material properties (e.g., flexibility), and it is desirable to use a feedback process that determines not only the dimensions of a partially fabricated object, but also that determines which material is present at each location on the object, in order to plan which and/or how much of each material to deposit at each location in a further layer. Therefore, a scanning approach used in the feedback procedure must be able to distinguish between different materials, for example, based on spectral properties (e.g., color) of reflectance from a partially fabricated object. Furthermore, because material layers can be quite thin, and in general the materials are not completely opaque, properties of subsurface layers can greatly affect the reflectance of a thin layer of one material over a thicker section of another material. Therefore detection of locations of thin layers after a material change may have to take into account the reflectance characteristics of the object before the thin layer was deposited.

In one aspect, in general, a 3D object is scanned during an additive manufacturing process to determine a material composition of a deposited layer of a partially fabricated 3D object. A first partial fabrication of the 3D object is scanned prior to depositing a material layer to produce first scan data. Fabrication material is then deposited to form the deposited layer on the first partial fabrication of the 3D object forming a second partial fabrication of the 3D object. The second partial fabrication of the 3D object is then scanned to produce second scan data. A layer characterization for the deposited layer, for example over the surface of the partially fabricated object, is determined by comparing the first scan data and the second scan data.

Aspects can include or one or more of the following features.

The scanning of a partial fabrication of the 3D object includes acquiring an image of the partial fabrication of the 3D object.

The scanning includes causing optical output from the 3D object at a plurality of wavelengths. In some examples, causing the optical output comprises at least one of illuminating the 3D object causing reflection or scattering from, or absorption in the 3D object, and chemical and or electromagnetic excitation of an emission from material in the 3D object.

The material layer includes at least two materials. In some examples, each material of the at least two materials is distinguishable in the first and the second scan data. For instance, each material has corresponding optical output with a corresponding different spectral content.

The first scan data and the second scan data each characterize a set of spectral characteristics of the optical output from the 3D object at each location of a plurality of locations. In some examples, the first scan data and the second scan data for each location in the plurality of locations are compared by comparing the spectral characteristics in the set of spectral characteristics. Each set of spectral characteristics of the optical output may be represented as one or more vectors. In such cases, comparing the spectral characteristics in the set of spectral characteristics includes calculating a vector difference and a calculation of angles between vectors based in part on the set of spectral characteristics.

Other features and advantages of the invention are apparent from the following description, and from the claims.

DETAILED DESCRIPTION

1 System Overview

Figure 1:
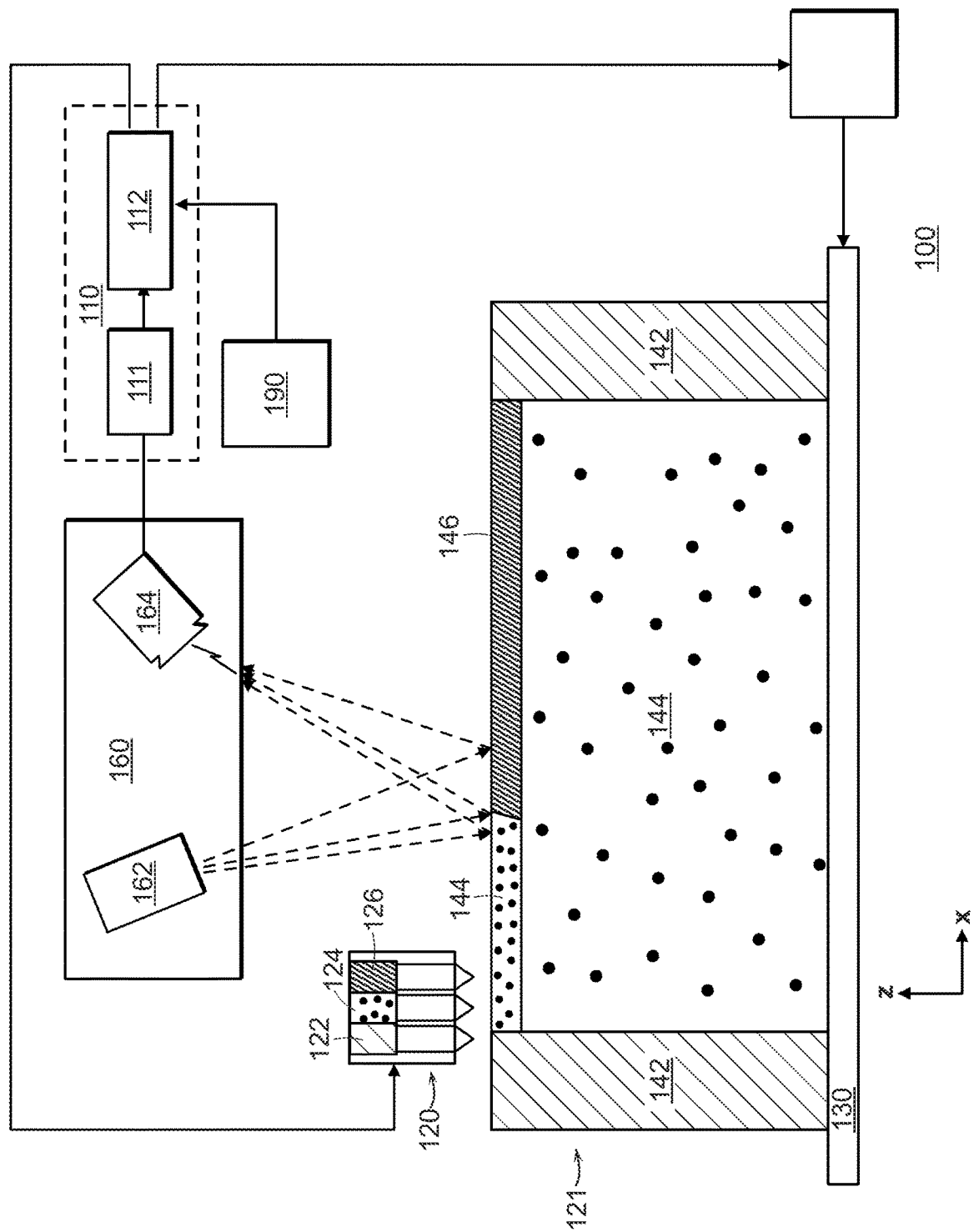
FIG. 1 is an exemplary additive fabrication device with a material detector system.

The description below relates additive fabrication, for example using a jetting-based 3D printer 100 shown in FIG. 1. As is described in greater detail below, the printer 100 includes a controller 110 that processes data from a sensor 160 using a sensor data processor 111 to determine surface data related to an object under fabrication 121. That surface data is used as feedback by a planner 112 to determine future printing operations.

The printer 100 uses jets 120 (inkjets) to emit material for deposition of layers on a partially fabricated object. In the printer illustrated in FIG. 1, the object is fabricated on a build platform 130, which is controlled to move relative to the jets (i.e., along an x-y plane) in a raster-like pattern to form successive layers, and in this example also to move relative to the jets (i.e., along a z-axis) to maintain a desired separation of the jets and the surface of the partially fabricated object 121. As illustrated, there are multiple jets 122, 124, 126 with one jet 122 being used to emit a support material to form a support structure 142 of the object, and the other jets 124, 126 being used to emit build material to form the build material 144 and 146, respectively, of the object itself. For materials for which curing is triggered by an excitation signal, such as an ultraviolet illumination, a curing signal generator 170 (e.g., a UV lamp) triggers curing of the material shortly after it is jetted onto the object. In other embodiments, multiple different materials may be used, for example, with a separate jet being used for each material. Yet other implementations do not necessarily use an excitation signal (e.g., optical, RF, etc.) and rather the curing is triggered chemically, for example, by mixing multiple components before jetting, or jetting separate components that mix and trigger curing on the object. Note that in some examples, after the additive deposition is complete, the object may be subject to further curing (e.g., to complete the curing), for example, by further exposing the object to UV radiation.

A sensor 160 is used to determine physical characteristics of the partially fabricated object, including one or more of the surface geometry (e.g., a depth map characterizing the thickness/depth of the partially fabricated object), as well as the surface material, for example, distinguishing between the support material 142 and each of the build materials 144, 146. While various types of sensing can be used, at least some examples described herein relate to the use of a reflective approach in which an emitter 162 illuminates the surface of the object with multiple wavelength light (e.g., "white" light), and a detector 164 receives the associated reflection from the object. In this document, "reflection" from an object should be understood broadly to include any throwing back of light energy that shines on an object, including specular reflection (i.e., as in a mirror, also referred to as regular reflection), diffuse reflection (i.e., where light is thrown back at many angles and not at a single angle based on the angle of incidence), and scattering. As discussed further below, spectral characteristics of the optical signals received by the camera can be used to distinguish the materials of the object. As discussed below, there are alternative sensor arrangements, with an important class of such arrangements sharing the property that signals passing from the object to the sensor encode the material being sensed in spectral properties of the received signal.

The controller 110 uses a model 190 of the object to be fabricated to control motion of the build platform 130 using a motion actuator 150 (e.g., providing three degrees of motion) and control the emission of material from the jets 120 according to the non-contact feedback of the object characteristics determined via the sensor 160. Use of the feedback arrangement can produce a precision object by compensating for inherent unpredictable aspects of jetting (e.g., clogging of jet orifices) and unpredictable material changes after deposition, including for example, flowing, mixing, absorption, and curing of the jetted materials.

In the arrangement of FIG. 1, the sensor 160 is positioned above the object under fabrication 121 and measures characteristics of the object 121 within a given working range (e.g., a 3D volume). The measurements are associated with a three-dimensional (i.e., x, y, z) coordinate system where the x and y axes are treated as spatial axes and the z axis is a depth axis.

In FIG. 1, an example fabrication of an object is illustrated in cross-section (i.e., for a particular value of y) with support material 142 having been built up on the sides of the object. The partial object is built up of material 144, with a top-most (i.e., most recently deposited) layer having a portion that continues to be formed of material 142 and a second portion of material 146. In this example, the sensor data processor 111 processes the received optical signals to accurately locate the transition point between the two materials on the top layer.

2 Sensor Data

A first aspect of the sensor 160 arrangement of the printer 100 is that different materials yield different spectral responses. That is, the optical signals emitting from the object that are sensed are multi-spectral (energy at multiple frequencies) and differences between spectral distributions from different materials can be used to distinguish the different materials.

In some examples, each of the materials has a different color, and the emitter 162 is a white light lamp which illuminates the object, and the detector 164 is a visible light camera that produces multiple color values for each point, for example, according to a conventional color model, such as Red-Green-Blue (RGB). That is, the continuous distribution of spectral energy received from the object is reduced to the response to three spectral detectors, each with a corresponding response spectrum. The particular color model is not critical, and similar approaches may be achieved with any standard multi-coordinate color model such as RGB, HSV, CMY, or multi-spectral measurements, and using detectors with different spectral response over visible or invisible wavelengths. While these color models may have three dimensions, detectors that are sensitive to more spectral characteristics can provide more degrees of freedom, which may improve the performance of the described methods. The RGB color model is used in the description of the methods below. For example, each pixel of the detector 164 returns red, green, and blue values and these RGB values are treated as three-dimensional coordinates such that one material 144 ideally has a response ($r_1$, $g_1$, $b_1$) (e.g., red) and a second material 146 has a response ($r_2$, $g_2$, $b_2$) (e.g., blue).

As discussed more fully later in this document, the materials do not necessarily have different colors naturally under white light. For example, the materials may be substantially transparent to visible light and the spectral responses may instead be different in a non-visible part of the spectrum such that the emitter 162 and detector 164 are configured to operate in such a spectrum. Furthermore, different mechanisms may be used to cause signals to pass to the detectors, including absorption, reflection, scattering, and fluorescence, and differences in material properties may cause the distinguishing spectral properties. In some examples, the materials do not naturally have different spectral properties, and different additives or combinations of additives are added to the materials, thereby coding each material with a different spectrum that can be used to distinguish such "coded" materials. For the sake of exposition, the example of FIG. 1 is described in the "RGB" context.

Figure 2:
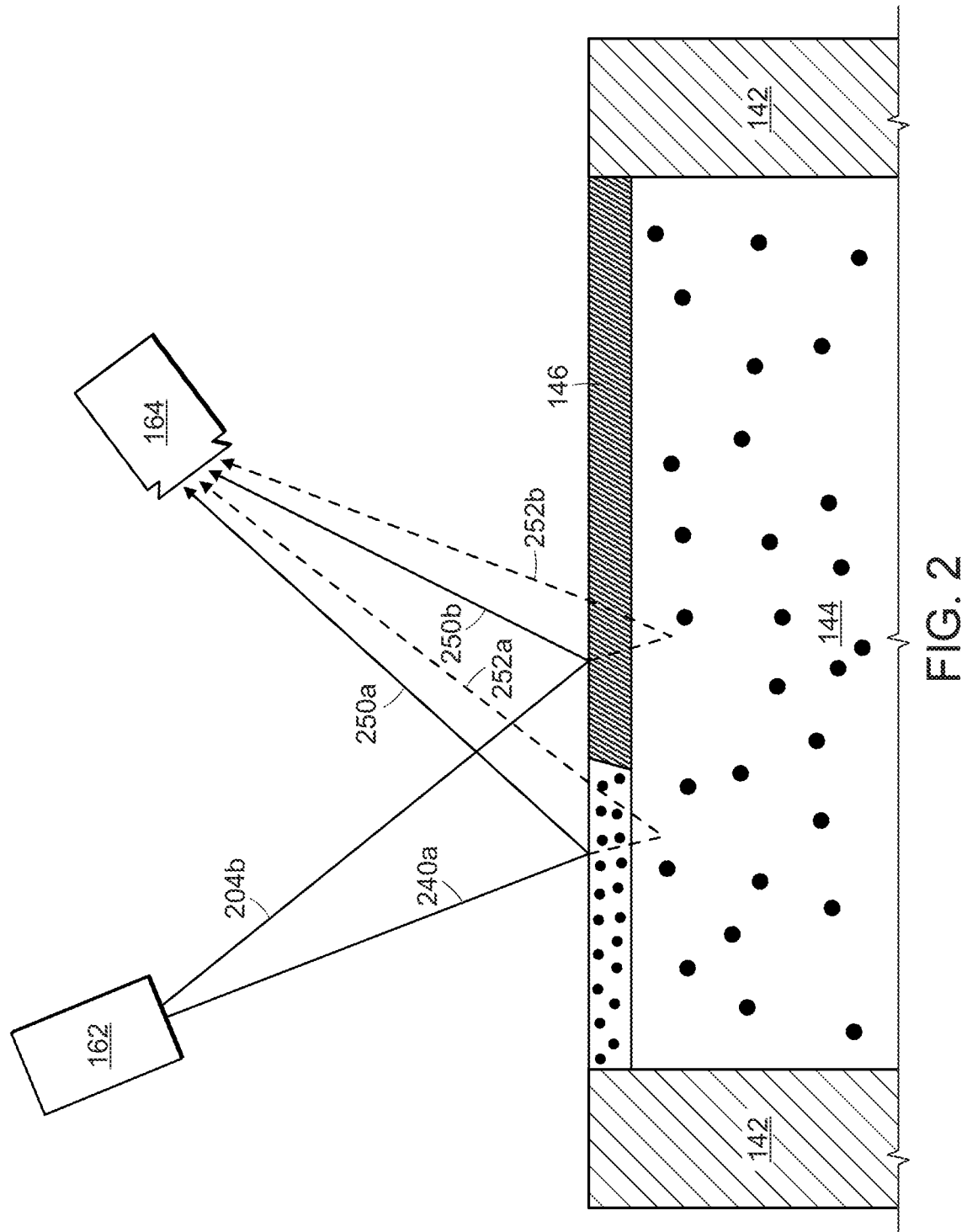
FIG. 2 is a detailed view of the material detector system.

Referring to FIG. 2, a property of the sensor 160 of FIG. 1 is that the sensor data does not in general merely characterize the material at the surface of the partially fabricated object. That is, light impinging on the object 121 from the emitter 162 is not all reflected or absorbed at the surface. Rather, at least some of the light is transmitted into the object, reflected (e.g., scattered) within the object, and absorbed on the path into and back out of the object. For example, a ray 240*a* impinging on the first material 144 may have a reflection or scattering from (or very near to) the surface producing a surface signal 250*a* that is received at the detector. The ray 240*a* may also pass into the object, here also the first material 144 below the surface, and causing a sub-surface reflection of a signal 252*b*. In this case where the surface and the sub-surface are the same material, both signals 250*a* and 250*b* share the characteristics (i.e., color) of the first material. However, in a region of the object that has a thin layer of the second material 146 over the first material 144, a ray 240*b* impinging on the object may have a direct reflection or scattering of a signal 250*b*, which has spectral characteristics of the second material. However, parts of the ray 240b passing into the material and reflected or reflected or scattered below the thin layer will have substantially the spectral characteristics of the first material (ignoring the effects of the signal passing through the thin layer of the second material).

The result is that for a location at a change of material, the detector receives a combination of the spectral responses of the first material and the spectral response of the second material. For example, rather than yielding a blue response from the ray 240b, the combined response may be purple. Because the layer of material 146 may be quite thin, the purple response may be very close in color to the red of the first material alone, and therefore it may be difficult to locate the transition point at which the layer of the second material starts. The specific nature of the combination of responses at a change of material can be quite complex, depending for example, on the absorption spectrum of each material (which may be modified using additive dyes), and/or the scattering spectrum (which may be modified by pigments in the material). Furthermore, the thickness of the new material added to the existing material will in general affect the response of the combination of materials.

3 Sensor Data Processing

As described below, a number of approaches are based on the observation that as more and more of a second material is deposited on top of a first material, the response of the combination will make a transition from the response of an object fabricated from the first material to a response of an object of fabricated from the second material. Approaches to discrimination of the material of even a thin layer generally make use of this observation.

In a number of embodiments, the processing of the sensor data makes use of a differential response approach in which a response at an (x, y) location is compared before and after application of a layer (or multiple layers) of material, and also makes use of a database of expected responses of the materials themselves.

The following notation is used in the description of the computational procedure implemented by the sensor data processor 111. A response $O_n$ is a numerical vector representing the response after depositing the $n^{th}$ layer at a particular (x, y) location of the object (the dependence on the (x, y) coordinates are omitted in the description of processing that is performed independently for each location). In some examples, each entry of the response $O_n$ corresponds to a different detector with a different spectral (i.e., frequency) response. For example, in a conventional camera used as a detector, the entries may be associated with red, green, and blue (RGB) values output from the camera (i.e., after internal conversion from raw sensor values to a standard RGB color space). Alternatively, raw camera responses to three or four different detector types on its image sensor are used directly as the entries of the vector response. Transformation of the response by linear or non-linear processing into color spaces such as XYZ or HSV may also be used. In general, the approaches described below are largely independent of the color space used to represent the response. In some examples, the response values are normalized to correspond to a constant (e.g., unit) vector magnitude, or correspond to a constant signal strength (e.g., fixed V value in an HSV color space). In some examples, a color space transformation is used that maximally separates the responses to the colors or different materials that may be encountered during fabrication (e.g., using Linear Discriminant Analysis, LDA, or a neural network based classifier).

In the RGB case, $O_n=(r_n, g_n, b_n)$. The response for the previous layer is denoted $O_{n-1}$. The difference in response is denoted $C=O_n-O_{n-1}$. If the $n^{th}$ layer is the same material as the layers below it, then the vector magnitude of the difference, |C|, is expected to be small. The expected color vector ("reference" vector) for a response from pure material k is denoted $M_k=(r^{(k)}, g^{(k)}, b^{(k)})$. Note that $M_k$ corresponds to a direction in color space (i.e., from the origin in the color space to the point in the color space), and the intensity (e.g., vector magnitude) may depend on a number of factors, for example the particular configuration of the sensor 160.

Figure 3:
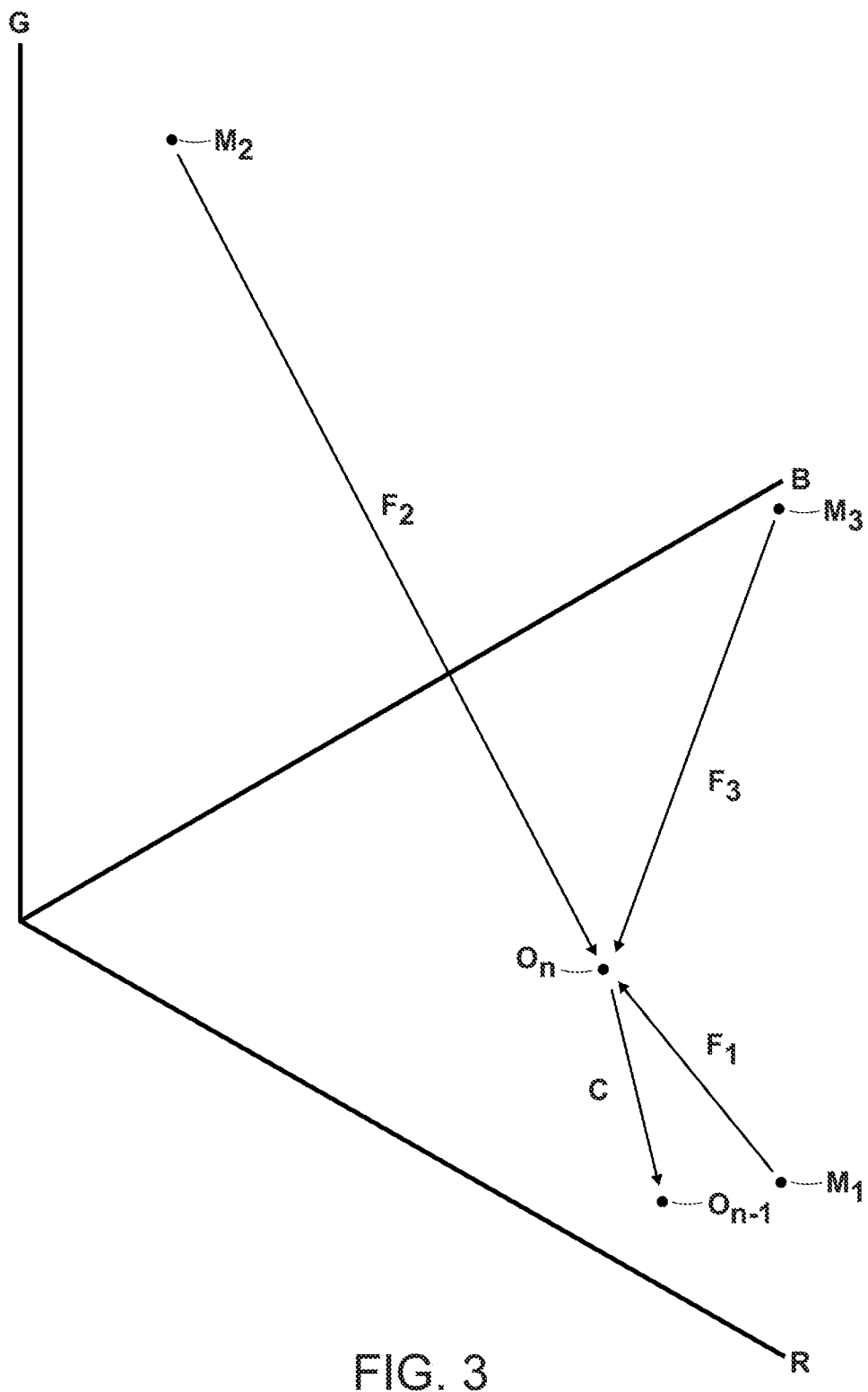
FIGS. 3-4 are perspective views of a color space.

Referring to FIG. 3, an RGB color space includes reference vectors $M_1$, $M_2$, and $M_3$, corresponding to materials with close to pure red, green, and blue colors, respectively. In a situation in which material 1 (red) is deposited at layer n on top of a section of previously deposited material 1, then $O_n$, as well as $O_{n-1}$, are expected to be close to $M_1$, as illustrated in the FIG. 3. That is, if material 1 is deposited on top of material 1, then |C|, where "||" denotes a magnitude of a vector, is expected to be small.

Figure 4:
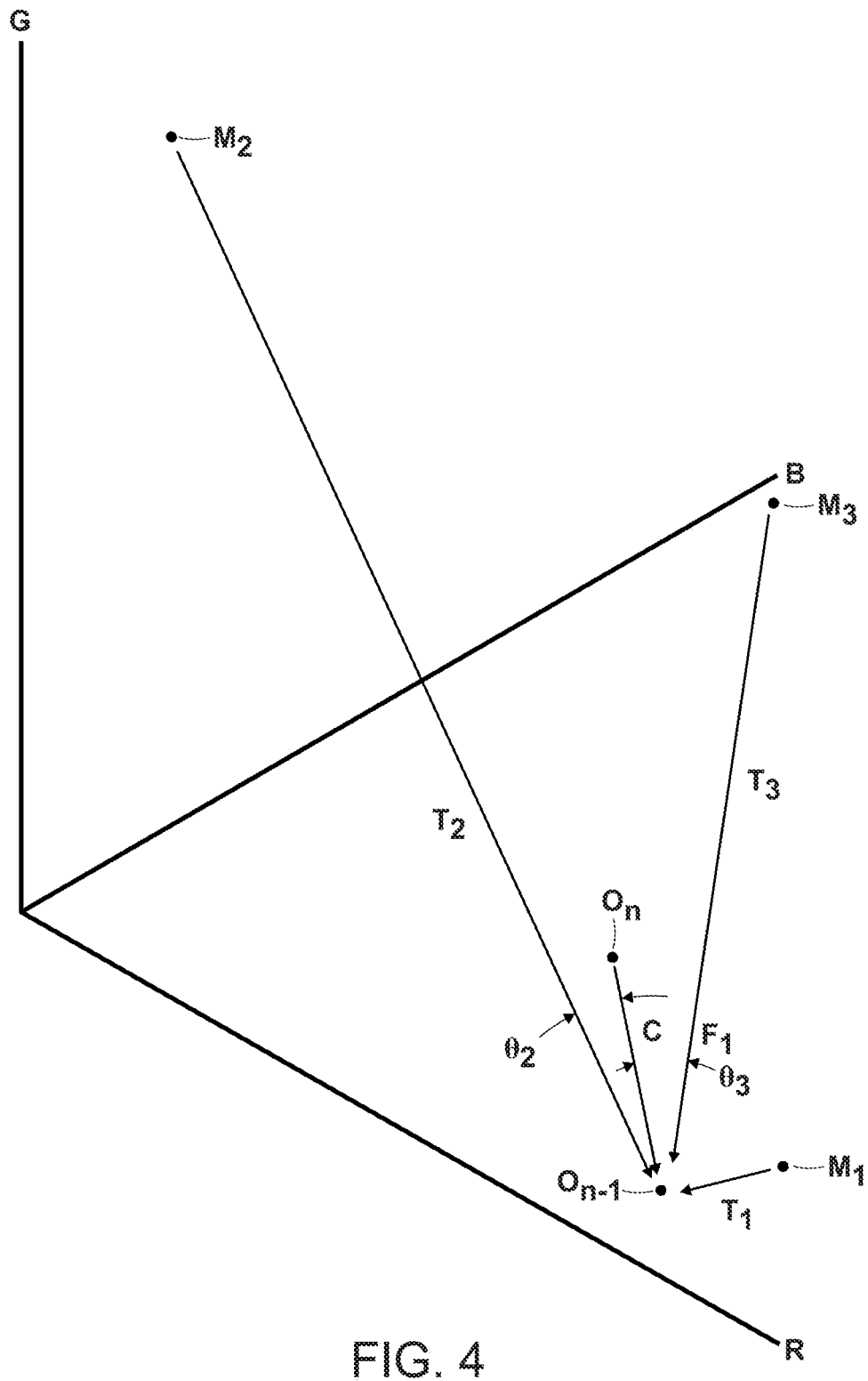

Referring to FIG. 4, in a situation in which material 2 (green) is deposited at layer n on top of a section of previously deposited material 1 (red), then $O_{n-1}$ is expected to be close to $M_1$. Because the impact of the $n^{th}$ layer may be relatively small, $O_n$ may still be substantially closer to $M_1$ than the other reference vectors $M_k$ for k≠1. However, the magnitude of the difference, |C|, is expected to be larger than if material 1 were continued to be deposited. Furthermore, as more and more layers of material 2 are deposited, then the response is expected to approach the direction $M_2$. Therefore, the change C is expected to be in the direction of the reference $M_2$. That is, a target direction for material 2, $T_2=O_{n-1}-M_2$ and the change $C=O_{n-1}-O_n$ are expected to be in the same or similar direction. This can be quantified by the angle computed using an inner product, $\theta_2=\angle(C, T_2)= \cos^{-1}(C \cdot T_2)/(|C||T_2|)$, where $\angle(C, T_k)$ denotes the angle between C and $T_2$, "·" denotes a "dot" or inner product, and $\cos^{-1}$ is an inverse cosine (also referred to as arccos). Note that with the transition from material 1 to material 2 at layer n, the sequence of outputs $O_n, O_{n+1}, \ldots$ does not necessarily follow an exactly straight line to $M_2$, for example, depending on the color space used, and on the physical phenomena (absorption, scattering, difference in magnitude of $M_1$ versus $M_2$, etc.) causing the combination of the responses of the individual materials. However, in general there is sufficient separation of the $M_k$ for different materials such that the angle for the true material is smaller than the angle for the other materials, in this case for all k not equal to 1 (the prior material) or 2 (the true next material). This approach is referred to as "background subtraction."

Referring back to FIG. 3, another useful quantity is a $F_k=O_n-M_k$, which represents the spectral difference if the new $n^{th}$ layer was deposited on material k. For example, if material 1 was deposited on material 1, then |$F_1$| would be expected to be small. Similarly, because of the negligible effect of the $n^{th}$ layer on $O_n$, regardless of whether material 1 or material 2 is deposited on material 1, |$F_1$| would still be expected to be small, and smaller than |$F_2$|. Another case to be considered is when there is little change in the response between layers, with |C| being small (i.e., as small as when the material does not change), but neither $O_n$ nor $O_{n-1}$ being in one of the reference directions $M_k$. This situation may occur, for example, when a small number of layers of a semi-transparent material are deposited on a color not corresponding to one of the reference colors. For example, the first layers that are deposited on a build platform (which may be black) may have this property. Note that the situation of the initial fabrication on the build platform may also be determined based on dimensional scanning of the partially fabricated object.

Four cases can be defined based on two thresholds, which can be set manually and empirically, $\epsilon_1$ related to C and $\epsilon_2$ related to $F_k$:

1. $|C| > \epsilon_1$ and $|F_k| > \epsilon_2$ for all k: there is a large color change and the final observation is far from any base material colors.
2. $|C| > \epsilon_1$ and $|F_k| \leq \epsilon_2$ for some k: there is a large color change and the final observation is close to a base material color (i.e., one of the reference colors).
3. $|C| \leq \epsilon_1$ and $|F_k| > \epsilon_2$ for all k: there is a small color change and the final observation is far from all colors.
4. $|C| \leq \epsilon_1$ and $|F_k| \leq \epsilon_2$ for some k: there is a small color change and the final observation is close to a base material color.

Cases 1 and 2 are typical cases during the transitional period when a small number of layers of a new material are deposited on a background material. Case 3 is representative of little to no material being printed during the transitional period. Case 4 occurs when many layers of the same material have been printed such that the current and previous layers both are measured to be the same color as the base material, plus possibly some measurement noise. Cases 3 and 4 can be combined with height data to help determine whether or not any material has been printed prior to the current observation. Cases 3 and 4 can occur whether or not any material has been printed between the prior and current observations. When one of cases 3 or 4 occurs then $O_n$ should be classified as the same material as $O_{n-1}$.

Two metrics are sufficient to potential misidentifications which could occur in cases 2-4. The first metric is obtained by taking the inner product between length-normalized versions of $(O_{n-1}-M_k)$ and $(O_n-M_k)$ for each material for each material k or alternatively by using some other vector comparison function, such as the angle between the two vectors. It is likely that there was no change in material between the two observations if all vector orientations are very similar as in the case where all dot products are very close to 1. The material of $O_n$ is instead determined to be the same as that as $O_{n-1}$ when this happens.

The second metric is obtained by the magnitude of the difference in response $|C| = |O_n - O_{n-1}|$. If the difference in responses between the two observations is very small then the identification is likely incorrect due to noise factors. In this case the material of $O_n$ is instead determined to be the same as that as $O_{n-1}$.

A procedure that can be used to estimate the material of the $n^{th}$ layer, denoted $\hat{m}_n$, is based on the prior and current responses, $O_{n-1}$ and $O_n$, respectively, and the set of reference color responses $\{M_k\}$ as follows:

function material_estimate $(O_n, O_{n-1}, \{M_k\}, \hat{m}_{n-1})$
{
  $C \leftarrow (O_{n-1} - O_n)$; $\hat{C} \leftarrow C/|C|$
  $T_k \leftarrow (O_{n-1} - M_k)$; $\hat{T}_k \leftarrow T_k/|T_k|$ for all materials k;
  $F_k \leftarrow (O_n - M_k)$; $\hat{F}_k \leftarrow F_k/|F_k|$ for all materials k;
  $\hat{k} \leftarrow \text{argmax}_k(\hat{C} \cdot \hat{T}_k + \hat{F}_k \cdot \hat{T}_k)$;
  if $\hat{F}_{\hat{k}} \cdot \hat{T}_{\hat{k}} > \epsilon_1$ for all materials k or $|C| < \epsilon_2$ then
    $\hat{m}_n \leftarrow \hat{m}_{n-1}$; /* no change in color */
  else
    $\hat{m}_n \leftarrow \hat{k}$; /* change in color */
  return $\hat{m}_n$;
}

4 Materials and Additives

Spectral characteristics of a material may be based on pigments in the material. The particular pigment determines the spectral response of light reflecting or scattering from the pigment. For example, the material may be substantially transparent and light that does not interact with the pigment passes through without substantial spectral modification.

Spectral characteristics may also be based on dyes in the material. In this case, as light passes through the material, the dye or dyes in the material determine the absorption spectrum of the material. With the light entering the material from the top surface, there must be some reflective or scattering component in the material to direct the light back out of the surface. In some examples, for example when the material does not have inherent reflective or scattering material, a broadband scattering additive such as titanium dioxide particles provide the needed scattering of the light. The spectrum of the light exiting the material is therefore attenuated in the spectral regions associated with the dye(s) in the material.

As introduced above, a single printed layer can be thin enough to be substantially transparent without added dyes and scattering agents. In the case of materials whose color is generated solely by added dyes it may be particularly important to include scattering material in order to cause the emitted light that has spectral content determined from the top layer. Also, a combination of two or more dye-based materials in certain thicknesses can absorb enough light to give an incorrect result. Another issue is that if the printed materials do not have sufficient scattering then pure colors can look very dark relative to white, giving a limited dynamic range of detectability. In addition, the combination of materials could be blacker than either material alone. This can lead to an observed color shift away from all possible materials such that an accurate identification cannot be made. The added scatter agent also addresses such issues.

5 Alternatives

As introduced above, a number of different sensor approaches may be used. Light may shine on the object from above (i.e., impinging on the most recently deposited layer) and pigment or dyes may affect the spectral content of the light detected as coming back from the object. In some alternatives, light shines through the object (e.g., from an illuminated build platform), and absorption characteristics (e.g., from added dyes coding the different materials) cause the differences in spectral characteristics. In some alternatives, fluorescence of the build material may be excited from above or from below the object, for example, with ultraviolet light. The spectrum of the material may be determined by the particular fluorescent material, and/or the dyes in the material. When additives are used, a wide variety of elements not naturally present in the materials can be used in order to increase reflection, scattering or luminescence. Such additives may include one or more of: small molecules, polymers, peptides, proteins, metal or semiconductive nanoparticles, and silicate nanoparticles.

A number of different types of scanning techniques may make use of such emission, including laser profilometry (e.g., using confocal or geometric approaches), or structured light scanning (e.g., projection methods using incoherent light). In general, in some such techniques, the object is illuminated or otherwise excited with electromagnetic radiation (e.g., light or radio frequency radiation) from one position, and the emissions are detected or imaged from another location, and the geometric relationship of the positions is used to compute the coordinates of the point at which the object is illuminated and therefore the point from which the emission originates.

The printer may use the information regarding the material deposited across the object for a variety of purposes including: 1) process monitoring and creating digital replicas of manufactured objects; 2) real-time digital feedback loop for contactless additive manufacturing; 3) data-capture for digital process modeling and correction of systematic printing errors.

As an alternative to the vector computations described above, an alternative procedure may use a neural network that receives the previous two scans $O_n$ and $O_{n-1}$ and is trained to classify the material of the $n^{th}$ layer using its trained comparison of the two scans. The neural network may be trained on data for which the true materials are known, for example, by fabricating calibration objects with known patterns of materials, and training the neural network on the scans obtained during the fabrication of the calibration objects.

In some alternative, the color response may be useful to infer a thickness of a color layer. For example, the thicker the layer, the stronger the response from the layer, and therefore the magnitude in addition to the direction of the change in response can be used.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for scanning a 3D object during an additive manufacturing process, the method comprising determining a material composition of a deposited layer of a partially fabricated 3D object, the determining comprising:
   scanning a first partial fabrication of the 3D object prior to depositing a material layer to produce first scan data;
   depositing fabrication material to form the deposited layer on the first partial fabrication of the 3D object forming a second partial fabrication of the 3D object;
   scanning the second partial fabrication of the 3D object to produce second scan data;
   determining a layer characterization for the deposited layer including comparing the first scan data and the second scan data.

2. The method of claim 1 wherein the scanning of a partial fabrication of the 3D object includes acquiring an image of the partial fabrication of the 3D object.

3. The method of claim 2 wherein the scanning includes causing optical output from the 3D object at a plurality of wavelengths.

4. The method of claim 3 wherein causing the optical output comprises at least one of (a) illuminating the 3D object causing reflection from the body of the object or, absorption in the 3D object, and (b) chemical and/or electromagnetic excitation causing an emission from material in the 3D object.

5. The method of claim 4, wherein causing the optical output comprises illuminating the 3D object causing scattering within the body of the object.

6. The method of claim 5, wherein causing scattering within the body of the object comprises scattering from additive particles in the body of the object.

7. The method of claim 6, wherein causing the optical output further comprises absorption within the body of light scattered in the body of the object.

8. The method of claim 4, wherein causing the optical output comprises illuminating the 3D object with an illumination signal object causing absorption in the body of the object wherein the optical output comprises components of the illumination signal passed through the object and not absorbed in the body of the object.

9. The method of claim 1 wherein the material layer includes at least two materials.

10. The method of claim 9 wherein each material of the at least two materials is distinguishable in the first and the second scan data.

11. The method of claim 10 wherein each material has corresponding optical output with a corresponding different spectral content.

12. The method of claim 1, wherein the first scan data and the second scan data characterize a set of spectral characteristics of the optical output from the 3D object at each location of a plurality of locations.

13. The method of claim 12, wherein comparing the first scan data and the second scan data includes, for each location in the plurality of locations, comparing the spectral characteristics in the set of spectral characteristics for said location in the first scan data and the second scan data.

14. The method of claim 13 wherein each set of spectral characteristics of the optical output are represented as one or more vectors.

15. The method of claim 14 wherein the comparing of the spectral characteristics in the set of spectral characteristics includes calculating a vector difference based in part on the set of spectral characteristics.

16. The method of claim 14 wherein the comparing of the spectral characteristics in the set of spectral characteristics includes calculating an angle between vectors based in part on the set of spectral characteristics.

* * * * *

UNITED STATES PATENT AND TRADEMARK OFFICE
CERTIFICATE OF CORRECTION

PATENT NO. : 10,926,473 B1
APPLICATION NO. : 16/796137
DATED : February 23, 2021
INVENTOR(S) : Wojciech Matusik, Aaron Weber and Desai Chen Page 1 of 1

It is certified that error appears in the above-identified patent and that said Letters Patent is hereby corrected as shown below:

In the Specification

The following paragraph should follow immediately after the Title in Column 1 Line 3:
STATEMENT AS TO FEDERALLY SPONSORED RESEARCH
This invention was made with Government support under Agreement No. HR00111790014, awarded by The Defense Advanced Research Projects Agency (DARPA). The Government has certain rights in the invention.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*